United States Patent
Song et al.

(10) Patent No.: US 10,099,456 B2
(45) Date of Patent: Oct. 16, 2018

(54) SYSTEMS AND METHODS FOR COMPOSITE RADIUS FILLERS

(71) Applicant: THE BOEING COMPANY, Chicago, IL (US)

(72) Inventors: Weidong Song, Woodinville, WA (US); Tia Benson Tolle, Edmunds, WA (US); Jonathan D. Robbins, Snohomish, WA (US); Jamie J. Langabeer, Everett, WA (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 14/812,321

(22) Filed: Jul. 29, 2015

(65) Prior Publication Data

US 2017/0029579 A1   Feb. 2, 2017

(51) Int. Cl.
| | | |
|---|---|---|
| *B32B 27/30* | (2006.01) | |
| *B32B 27/38* | (2006.01) | |
| *B32B 27/28* | (2006.01) | |
| *C08J 5/04* | (2006.01) | |
| *B64C 1/06* | (2006.01) | |
| *B29C 39/00* | (2006.01) | |
| *D04H 1/00* | (2006.01) | |
| *B29L 31/30* | (2006.01) | |

(52) U.S. Cl.
CPC ............. *B32B 27/30* (2013.01); *B29C 39/00* (2013.01); *B32B 27/28* (2013.01); *B32B 27/38* (2013.01); *B64C 1/064* (2013.01); *C08J 5/047* (2013.01); *D04H 1/00* (2013.01); *B29L 2031/3082* (2013.01); *B32B 2250/40* (2013.01); *B32B 2262/0269* (2013.01); *B32B 2262/101* (2013.01); *B32B 2262/106* (2013.01); *C08J 2339/04* (2013.01); *C08J 2363/00* (2013.01); *C08J 2365/02* (2013.01); *C08J 2379/02* (2013.01)

(58) Field of Classification Search
CPC ......... B64C 1/064; B64C 39/00; B32B 27/28; B32B 27/30; B32B 27/38; B32B 2250/40; B32B 2262/0269; B32B 2262/101; B32B 2262/106; C08J 5/047; C08J 2363/00; C08J 2365/02; C08J 2379/02; C08J 2339/04; D04H 1/00; B29L 2031/3082
See application file for complete search history.

(56) References Cited

U.S. PATENT DOCUMENTS

| | | |
|---|---|---|
| 5,151,322 A | 9/1992 | Kimoto |
| 7,208,220 B2 | 4/2007 | Yamasaki |
| 8,101,262 B2 | 1/2012 | Yamanouchi |
| 8,709,319 B2 | 4/2014 | Gideon |
| 2003/0057590 A1 | 3/2003 | Loher |
| 2006/0125156 A1 | 6/2006 | Woolhouse |
| 2009/0110901 A1 | 4/2009 | Gaw |
| 2010/0178495 A1 | 7/2010 | Taketa |
| 2014/0166572 A1* | 6/2014 | Snyder ............... B01D 39/1623 210/507 |

* cited by examiner

*Primary Examiner* — Nathan M Nutter
(74) *Attorney, Agent, or Firm* — Joseph F. Harding; The Small Patent Law Group LLC

(57) ABSTRACT

A composite radius filler material is provided. The composite radius filler includes a resin, a first group of fibers dispersed within the resin, and a second group of fibers dispersed within the resin. The first group of fibers has a first length configured to facilitate orientation in a longitudinal direction. The second group of fibers has a second length that is shorter than the first length, with the second group of fibers configured to facilitate random orientation in a transverse direction.

11 Claims, 6 Drawing Sheets

SYSTEMS AND METHODS FOR COMPOSITE RADIUS FILLERS

FIELD OF EMBODIMENTS OF THE DISCLOSURE

Embodiments of the present disclosure generally relate to composite assemblies, and to composite radius fillers for use in providing composite assemblies.

BACKGROUND OF THE DISCLOSURE

Traditional radius fillers, also known as "noodles", used in composite structures may have less than desired structural properties. For example, noodles formed using pre-formed tape having a continuous fiber extending along the length of the noodle may have less than desired properties. Further still, certain traditional approaches utilized a pre-formed tape as the noodle, complicating assembly and/or requiring additional assembly steps. Also, certain traditional approaches utilize fiber extending continuously along a length of a structure. Such approaches may suffer from less than desired properties in directions transverse to the length, and may present obstacles to automation of noodle installation.

SUMMARY OF THE DISCLOSURE

Certain embodiments of the present disclosure provide a composite radius filler material configured to join at least two structural members along a length of the structural member. The radius filler has a transverse dimension extending perpendicularly to the length. The composite radius filler includes a resin, a first group of fibers dispersed within the resin, and a second group of fibers dispersed within the resin. The first group of fibers has a first length configured to facilitate orientation in a longitudinal direction. The second group of fibers has a second length that is shorter than the first length, with the second group of fibers configured to facilitate random orientation in a transverse direction.

Certain embodiments of the present disclosure provide a method (e.g., a method for providing a composite radius filler material configured for in-situ application for joining plural composite structures along a length of the plural composite structures). The method includes providing a resin. The method also includes adding a first group of fibers within the resin. The first group of fibers has a first length configured to facilitate orientation in a longitudinal direction. Further, the method includes adding a second group of fibers within the resin, the second group of fibers having a second length that is shorter than the first length, with the second group of fibers configured to facilitate random orientation in a transverse direction.

Certain embodiments of the present disclosure provide a composite structure that includes at least two structural members and a composite radius filler. The at least two composite structural members extend along a length. The composite radius filler joins the at least two composite structural members along the length, and has a transverse dimension (e.g., height, width) extending perpendicularly to the length. The composite radius filler includes a resin, a first group of fibers dispersed within the resin, and a second group of fibers dispersed within the resin. The resin includes a resin material that is compatible with a material forming a portion of the at least two composite structural members. The first group of fibers has a first length corresponding to the transverse dimension (e.g., between 0.25 and 2 times the transverse dimension). The first group of fibers has an aspect ratio of 2000 or less. The second group of fibers has a second length that is shorter than the first length (e.g., between 0.05 and 0.25 times the transverse dimension or other value substantially shorter than typical noodle cross section dimensions). The composite structure is formed by joining the at least two composite structural members with the composite radius filler to form a composite assembly and curing the composite assembly.

Certain embodiments of the present disclosure provide a method (e.g., a method of installing a noodle) includes mixing a resin and fibers to provide a composite radius filler material. The fibers include a first group of fibers and a second group of fibers. The first group of fibers has a first length that is corresponding to a transverse dimension of a longitudinal void to which the composite radius filler material is to be applied, with the first group of fibers has an aspect ratio of 2000 or less. The second group of fibers has a second length that is shorter than the first length. The method also includes applying the composite radius filler material to the longitudinal void to provide the noodle. Based on the first length of the first group of fibers relative to the transverse dimension of the longitudinal void, the first group of fibers are oriented in a longitudinal direction along a length of the void during application of the composite radius filler to the longitudinal void. Also, based on the second length of the second group of fibers, the second group of fibers are oriented in a transverse direction during application of the composite radius filler to the longitudinal void.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for providing composite radius filler materials and/or assembling structural components using composite radius filler materials. For example, compositions utilizing fibers of different lengths or aspect ratios dispersed within a resin are employed by various embodiments. The use of different lengths of fibers, as discussed herein, helps achieve balanced characteristics or properties of composite radius fillers in different directions. Further, in some embodiments, toughening agents may be added to a resin to improve resiliency of the resin and further resist cracking. Additionally or alternatively, thixotropic particles (e.g., nanoparticles) may be utilized to adjust viscosity for application of composite radius filler materials at different stages. Yet further still, in some embodiments, an additional group of fibers having a very short length (e.g., carbon nanotubes) may be utilized to address the potential effects of resin pockets.

Embodiments of the present disclosure provide improved composite radius fillers. Various embodiments provide composite radius fillers that have improved well balanced properties or characteristics in different directions. Various embodiments provide composite radius fillers that are more convenient and/or efficient for manufacture or assembly. Various embodiments provide composite radius fillers that may be applied in-situ to structural members to form a structural assembly.

Figure 1:
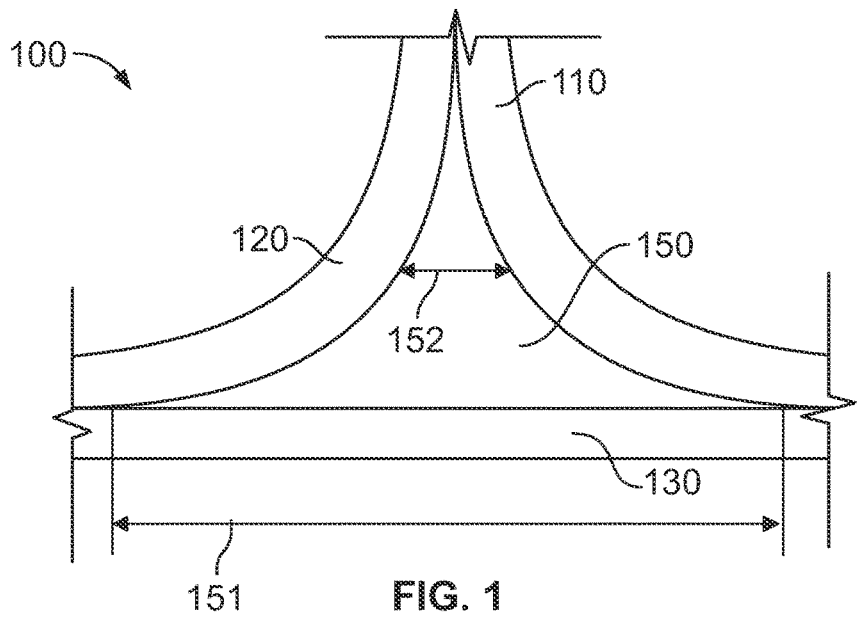
FIG. 1 illustrates a schematic cross-sectional view of a composite structure, according to an embodiment of the present disclosure.
Figure 3A:
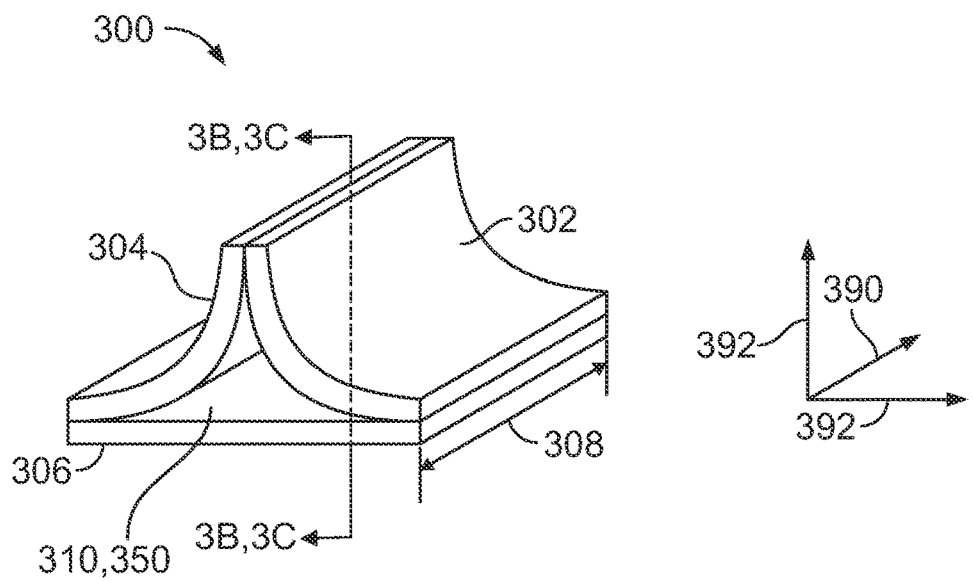
FIG. 3A is a schematic perspective view of a composite structural member.

FIG. 1 illustrates a schematic cross-sectional view of a composite structure 100, according to an embodiment of the present disclosure. The composite structure 100 includes a first composite structural member 110, a second composite structural member 120, a third composite structural member 130, and a composite radius filler (which may also be referred to as a "noodle") 150. The first composite structural member 110, second composite structural member 120, and third composite structural member 130 extend along a length (into the page as seen in FIG. 1; see also FIG. 3A). As seen in FIG. 1, the first composite structural member 110 and second composite structural member 120 have generally L-shaped cross sections, and are disposed opposite each other, with the third structural member 130 extending generally horizontally across under a base defined by the bottom portions of the L-shaped cross sections of the structural members 110, 120. The depicted composite radius filler 150 is disposed between the composite structural members 110, 120, 130, and joins the composite structural members 110, 120, 130 along their length (e.g., length 308 as seen in FIG. 3A). In the embodiment illustrated in FIG. 1, 3 members are being joined to form a structure where 2 of the members are bent or curved and thus form a radius. When 2 of the members are joined back to back with the flat third member a void is created. The composite radius filler 150 is configured to fill the void with a structure that effectively transmits loading. The composite radius filler 150 may be used to join the composite structural members to form a composite assembly including the composite structural members and the composite radius filler 150. The composite assembly (e.g., the structural members 110, 120, 130 joined by the composite radius filler 150) may be cured before use of the composite structure 100. It may be noted that the particular shapes of the components shown in FIG. 1 are provided by way of illustration and not limitation, and that other numbers, sizes, shapes, and/or arrangements may be employed in various embodiments. Other embodiments may include fewer or more structural members defining a void in which a composite radius filler is disposed.

Certain conventional composite radius fillers utilize continuous fibers running along substantially the entire length of the filler, and may be applied as a tape or similar pre-formed structure along the length. Such fillers, however, may have less than desired properties in one or more directions transverse to the length along which the continuous fibers extend. Various embodiments of the present disclosure provide improved performance and/or reliability for composite structures. For example, various embodiments provide improved mechanical properties, such as improved mechanical properties in one or more directions transverse to an axis extending along the length of a composite structure. Various embodiments also provide for improved assembly of composite structures, for example by providing a radius filler in a paste or paste-like form that may be formed and/or applied to composite structural members in-situ or at the time of assembly, in contrast to use of pre-formed radius fillers. For example, the paste or paste-like material may be more isotropic or uniform in comparison to radius fillers having continuous, long fibers. The paste or paste-like material may be used as part of an automated in-situ manufacturing process.

Generally, various types of additives or reinforcements may be added to a resin to form a composite material. Additives may be added to improve the mechanical properties of a resin system. Additives may be added to modify or enhance physical properties such as the coefficient of thermal expansion (CTE), thermal conductivity, electrical resistivity, friction, wear resistance, or flame resistance, among others. Various types of additives may be used. For example, additives may be made of one or more of ceramic, metal, plastic, carbon, or glass, among others. Additives may be provided in different shapes, such as particles, flakes, or fiber, among others. Various parameters that may be considered when choosing an additive include aspect ratio, volume fraction, additive chemistry, and additive/resin interface. It may be noted that additives may also change some of the properties of the resin matrix, for instance, tougheners can be added that blend into the resin, changing its properties.

In the illustrated embodiment, the composite radius filler 150 is made of a resin, a first group of fibers dispersed within the resin, and a second group of fibers dispersed with the resin. The resin, for example, may be an epoxy, or as another example, a phenolic resin. In various embodiments, the resin may include or be formed of a material that is compatible with a material of one or more of the structural members (e.g., a material used in a resin used with one or more of the structural members). It may be noted that the resin material for the radius filler may be the same as the resin material for the structural members, or the resin materials may differ but be compatible. As used herein, resin materials may be understood as compatible when the physical and possible chemical interaction between the resin materials will not adversely affect cure kinetics when the materials are in contact, or adversely affect the physical and chemical characteristics of the cured product. Examples of physical and chemical characteristics include, but are not limited to, mechanical properties and/or chemical resistance properties. A number of factors may affect resin compatibility. Chemical structure and molecular weight and distribution are examples of factors that typically affect compatibility. Dynamic mechanical analysis (DMA) is a tool which may be used to measure the rheology and identify compatibility characteristics of resin/polymer systems. In some embodiments, the radius filler resin material may be or include a material shared in common with one or more of the structural members. For example, if the structural members are composite structures having an epoxy resin, the same or similar epoxy resin may be utilized for the composite radius filler 150. As another example, if the structural members are composite structures having a phenolic resin, the phenolic resin may be utilized for the composite radius filler 150. It may be noted that the composite radius filler 150, even if using the same resin as the composite structural members, may use additional and/or alternative fillers or additives than those employed for the composite structural members. Additional discussion regarding various resins, fibers, and additional fillers or additives that may be utilized in various embodiments are discussed in connection with FIG. 2 herein.

Returning to FIG. 1, the fibers of the first group of fibers in the illustrated embodiment have a length that corresponds to typical noodle dimensions in transverse directions. The fiber lengths may correspond to an actual width of a composite radius filler or a design or intended width of the composite radius filler. For example, the composite radius filler 150 may have a width that is 0.5 inch wide, 1 inch wide, or 1.5 inch wide, among others. However, the first group of fibers may have a length of less than 10 millimeters. In various embodiments, the first group of fibers may have a length (or group of lengths) within a range of 0.25 times a transverse dimension (e.g., width of the composite radius filler, height of the composite radius filler) and 2 times the transverse dimension. The second group of fibers may have a length (or group of lengths) that is less than the transverse dimension, for example within a range of 0.05-0.25 times the transverse dimension. Further, the fibers of the first group of fibers may each have an aspect ratio (the ratio of the length of a fiber to the diameter of the fiber) between about 100 to 2000. In some embodiments, the first group of fibers may have a substantially uniform length, while in other embodiments the first group of fibers may include a mix of fibers having different lengths. In various embodiments, the use of a first group of fibers as discussed herein may provide improved resilience. Additionally, the use of a first group of fibers as discussed herein may provide improved mechanical properties (e.g., lower coefficient of thermal expansion (CTE)) along an axial direction or length of the composite structure 100. Additionally, the use of a first group of fibers as discussed herein may also facilitate the application of the composite radius filler 150 in a paste or paste-like form. As seen in the illustrated embodiment, a transverse dimension 151 may be defined as an overall or maximum width of the composite radius filler 150 when disposed between the structural members 110, 120, 130. Alternatively, a transverse dimension 152 may be defined as a width at an intermediate height of the composite radius filler 150 when disposed between the structural members 110, 120, 130. In other embodiments, a transverse dimension may be defined as an average width. Other transverse dimensions (e.g., height) may be utilized additionally or alternatively in various embodiments.

The second group of fibers has a length that is less than the first group of fibers. The particular length of fibers from the second group of fibers may be selected based on a given application, for example to provide a second group of fibers having a length that is short enough to allow the second group of fibers to align in one or more directions that are transverse to the length of the composite structure 100 (e.g., shorter than a transverse dimension of an expected cross-sectional area between structural members, or a predetermined percentage of the transverse dimension, such as 5%, 20%, or 25%, among others). In various embodiments, the use of a second group of fibers as discussed herein allows for improved mechanical properties (e.g., strength or resilience, lower CTE) along transverse directions, improved isotropic characteristics, or improved uniformity of mechanical properties. For example, because the second group of fibers have a length that is smaller with respect to the transverse dimension than the length of the first group of fibers, the second group of fibers may be oriented at additional orientations, or more randomly, with respect to the transverse dimension than orientations provided by the first group of fibers.

Figure 2:
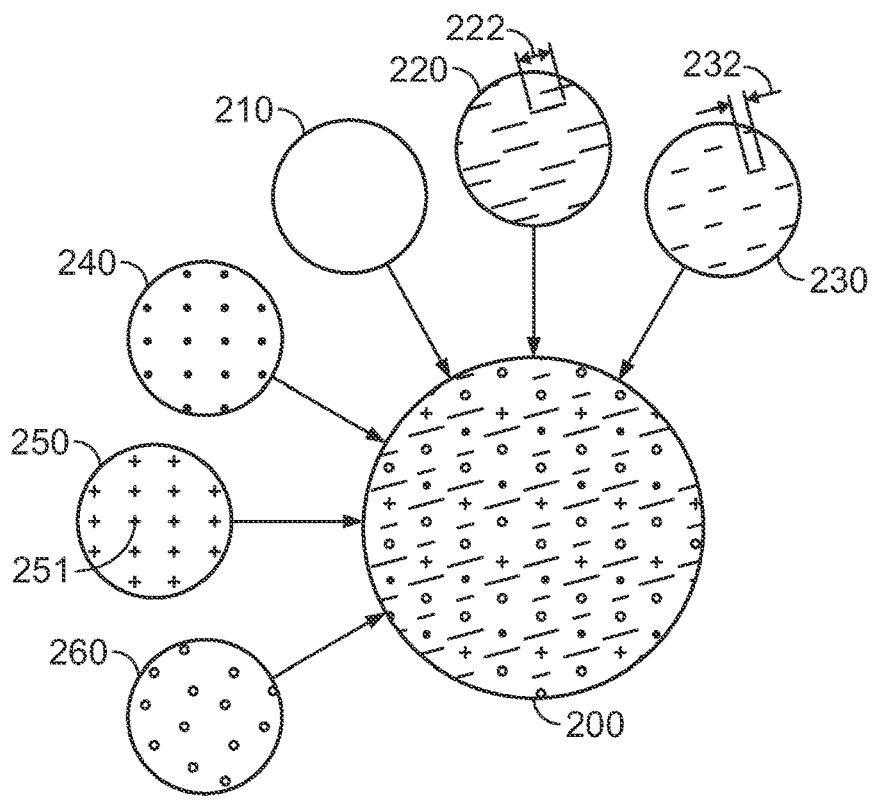
FIG. 2 is a schematic view of a composite radius filler, according to an embodiment of the present disclosure.

FIG. 2 provides a schematic view of a composite radius filler material 200 formed in accordance with an embodiment of the present disclosure. The composite radius filler material 200 of the illustrated embodiment is configured for in-situ application (e.g., formed as a paste or paste-like material that may be added to structural members at a time of assembly of the structural members) for joining plural composite structural members along a length. The depicted composite radius filler material 200 includes a resin 210, a first group of fibers 220 dispersed within the resin 210, a second group of fibers 230 dispersed within the resin 210, a third group of fibers 240 dispersed within the resin 210, thixotropic particles 250 dispersed with the resin 210, and a toughening agent 260 dispersed with the resin 210. The composite radius filler material 200 may be used, for example, to provide the composite radius filler 150.

Generally, one or more of the various additives (e.g., first group of fibers 220, second group of fibers 230, third group of fibers 240, thixotropic particles 250, toughening agent 260) are added to the resin 210 to improve one or more properties of the resulting composite radius filler material 200. For example, one or more of the additives may be utilized to lower the CTE of the composite radius filler material 200. As another example, one or more of the additives may be utilized to improve the elastic modulus of the composite radius filler material 200. As another example, one or more of the additives may be utilized to improve the tensile strength of the composite radius filler material 200. As one more example, one or more of the additives may be utilized to maintain a proper flow viscosity for manufacturability of a structure that the composite radius filler 200 is used in connection with.

In various embodiments, the particular configurations (e.g., lengths of fibers, proportions of fibers, fiber materials, proportions of different types and/or lengths of fibers, additional additives, or the like) of the composite radius filler material 200 are selected to balance desired properties for a given application. Generally speaking, the composite radius filler material 200 is configured to have high strength or resiliency in all directions, a low CTE, low modulus, and/or to have desired mechanical properties in all directions (e.g., along a length of a structure as well as transverse to the length of the structure). Certain materials or sizes of additives may beneficially impact one desired property while adversely impacting a different desired property. Accordingly, in various embodiments the proportion of a given material or materials is selected based on a balancing of the desired properties.

For example, the resin 210 may be selected to match or correspond to a resin used for composite structural members to be joined by the composite radius filler material 200. By way of example, epoxy, phenolic, benzoxazine, or bismaleimide (BMI) resins may be employed.

To improve the resilience and/or CTE of the resin 210, a filler such as fibers may be added. The fibers, for example, may include one or more of carbon fibers and/or fiberglass. For example, addition of fibers such as carbon fibers or fiberglass, which have CTE's substantially lower than typical resin materials, will lower the CTE of the composite radius filler material 200 (thereby lowering the amount of contraction during cooling, for example from a curing temperature).

Further, addition of fibers such as carbon fiber and/or fiberglass will also improve the strength of typical resin materials. However, fibers may have a high level of stiffness or modulus. If the stiffness or modulus of the composite radius filler material 200 is overly high, a radius filler made from the composite radius filler material 200 may not be able to stretch sufficiently. Accordingly, in various embodiments, the percentage of fibers (e.g., the percentage of fiber volume with respect to resin volume or total filler volume) may be selected to be high enough to provide improved strength and CTE, while low enough to provide a modulus that is not overly high.

Further still, it may be noted that for longer fiber lengths (e.g., fiber lengths that run continuously along an entire length or substantially the entire length), the fibers may provide sufficient or desired strength, CTE, or other properties in one direction (e.g., axial), but not in other directions (e.g., transverse). Accordingly, in various embodiments, fiber lengths or aspect ratios are selected to provide for improved uniformity of properties imparted via the fibers. For example, at least some of the fibers may be selected to have a length that is less than an expected cross-sectional or transverse dimension of the radius filler for which the material is to be used, or otherwise sized to provide a desired amount of fibers that will align transversely (e.g., at least partially transversely) to the length of the radius filler.

For example, at least some of the fibers may have a length that is ½ or less of a width and/or height of an expected cross-section of a radius filler formed from the composite radius filler material 200. In various embodiments, a first group of fibers is utilized to provide improved axial tensile strength, while a second, shorter group of fibers is utilized to provide improved transverse tensile strength and lower CTE. The aspect ratios of the fibers may be selected or configured to be high enough to provide a desired strength and/or CTE but low enough to provide improved homogeneity, or improved distribution of orientations (e.g., axial and transverse) of the fibers to provide improved uniformity of mechanical or structural properties.

The depicted first group of fibers 220 has a first length 222. It may be noted that the first length 222 may correspond to an average length, a maximum length, or other length representative of the lengths of the first group of fibers 220. The lengths of the individual fibers of the first group of fibers 220 may be substantially the same, or may differ. For example, in some embodiments, the lengths of the first group of fibers 220 may vary between 3 and 6 millimeters, or, as another example, the first group of fibers may have a length between 3 and 25 millimeters. Again, it may be noted that the lengths of fibers may be selected based on transverse dimensions (or expected transverse dimensions such as a maximum height or width, or average height or width, among others), and thus may include additional or different numerical values than those expressly mentioned herein.

It has been found, for various fibers, that, with increasing aspect ratio, the modulus of the composite radius filler material 200 increases. The majority of modulus increase is generally achieved for certain fibers at or near an aspect ratio of 100. It has also been found, for various fibers, that, with increasing aspect ratio, the strength of the composite radius filler material 200 increases. The majority of strength increase is generally achieved for certain fibers at or near an aspect ratio of 500. Accordingly, by using fibers having an aspect ratio of about 500, the strength may be at or near a maximum, while still allowing a relatively short fiber to improve fiber distribution and distribution of fiber orientations.

Further improvements to distribution of fibers (and resulting distribution of properties) may be achieved by utilizing additional shorter fibers. In some embodiments, the fibers of the first group have an aspect ratio of 2000 or less. In some embodiments, the fibers of the first group have an aspect ratio of 500 or less. In some embodiments, the fibers of the first group may have aspect ratios within a range between 100 and 2000. It may be noted that, generally, the fibers of the first group are more aligned in the axial direction in comparison to the fibers of the second group, which have a more random orientation in all directions (axially and transversely).

The depicted second group of fibers 230 has a second length 232. The second length 232 in the illustrated embodiment is less than the first length 222. It may be noted that the second length 232 may correspond to an average length, a maximum length, or other length representative of the lengths of the second group of fibers 230. The lengths of the individual fibers of the second group of fibers 230 may be substantially the same, or may differ. For example, in some embodiments, the lengths of the second group of fibers 230 may vary between 1 and 3 millimeters. In some embodiments, the average length of the first group of fibers 220 may be about two times or more greater than the average length of the second group of fibers 230. In some embodiments, the first group of fibers 220 may have an aspect ratio (or average aspect ratio) of 500, and the second group of fibers 230 may have an aspect ratio (or average aspect ratio) of 100.

In various embodiments, the aspect ratio (and/or length) of the first group of fibers 220 may be selected to provide a desired strength and/or CTE, and the aspect ratio (and/or length) of the second group of fibers 230 may be selected based on expected dimensions of a radius filler to be provided by use of the radius filler material 200 (e.g., the length of the second group of fibers 230 may be selected to be less than an expected transverse dimension, or to be less than a predetermined percentage of an expected transverse dimension, such as 5% of the transverse dimension, 10% of the transverse dimension, or 20% of the transverse dimension, among others).

Thus, the first group of fibers 220 may be utilized to impart one or more desired physical properties, and the second group of fibers 230 may be utilized to improve the distribution of the orientation of the fibers with respect to one or more transverse directions. For example, an aspect ratio of 500 may be beneficial for achieving desired strength and/or modulus properties. For a fiber with a diameter of 5 micrometers, such an aspect ratio would lead to a length of 2.5 millimeters, or about 0.1 inches. Such a length may be too long with respect to the transverse dimensions of a composite radius filler to be formed with the composite radius filler material 200, however. For example, fibers having a diameter of 5 micrometers and an aspect ratio of 500 may have a length that may cause partial alignment for typical noodle transverse dimensions. Such partial alignment may reduce performance in the transverse directions. For example, alignment of fibers may result in increases in CTE in the transverse directions. As another example, alignment of fibers may result in less than desired tensile strength in the transverse directions. Accordingly, if the first group of fibers has an aspect ratio of 500, a lower aspect ratio may be utilized for the second group of fibers to improve the distribution of the orientations of the fibers, or improve the randomness of the orientations of the fibers. With the fibers arranged in all directions, in contrast to being aligned in a single direction, a lower CTE may be achieved while also lowering the required volume fraction of fiber.

Figure 3B:
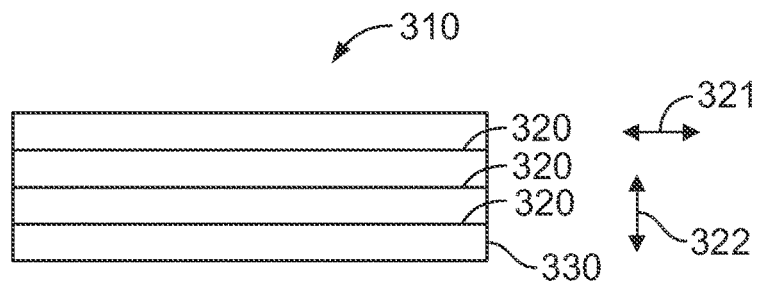
FIG. 3B is a schematic side sectional view of radius filler having continuous fibers oriented axially.
Figure 3C:
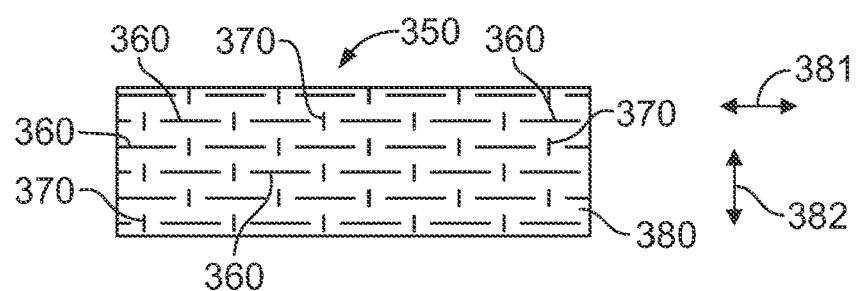
FIG. 3C is a schematic side sectional view of a radius filler having differently sized fibers, according to an embodiment of the present disclosure.

Generally, the lengths of the first group of fibers 220 and the second group of fibers 230 may be selected to provide a balance between transverse and axial properties. FIGS. 3A-3C schematically depict an improved balance of axial and transverse distribution of fibers and/or orientation of fibers that may be achieved by using first and second groups of fibers as discussed herein. FIG. 3A depicts a schematic perspective view of a composite structure 300. The composite structure 300 includes a first composite structural member 302, a second composite structural member 304, and a third composite structural member 306 joined along a length 308 by a composite radius filler 310, 350. The composite radius filler 310 corresponds to the filler 310 depicted in FIG. 3B. The composite radius filler 310 depicted in FIG. 3B, in contrast to various embodiments disclosed herein, includes continuous fibers 320 (e.g., fibers that extend continuously along a length of a composited structures). The composite radius filler 350 corresponds to the filler 350 depicted in FIG. 3C. For the view depicted in FIG. 3A, an axial or length direction 390 extends along the length 308, while transverse directions 392 extend perpendicularly to the axial direction 390. Additionally or alternatively to the transverse directions 392 depicted in FIG. 3A, a transverse direction may be defined radially. It may be noted that FIG. 3A is provided schematically for illustrative purposes only, and that the particular arrangement or proportion of the various components or dimensions may differ in practice. For example, the length 308 may be 100 feet, while the cross-sectional area of the composite radius filler may be less than one square inch in some embodiments. The view angles for FIGS. 3B and 3C are shown along line 3-3 of FIG. 3A.

FIG. 3B is a schematic side sectional view of a composite radius filler 310 having continuous fibers 320 embedded in or dispersed within a resin 330, with the continuous fibers 320 oriented axially. Thus, the composite radius filler 310 differs from the composite radius filler materials disclosed herein which have shorter fiber lengths that do not extend along the entire length of a noodle. As seen in FIG. 3B, the continuous fibers 320 extend substantially across the length of the composite radius filler 310. However, the fibers 320 of FIG. 3B extend only axially in direction 321 (or horizontally as seen in FIG. 3B) and not transversely in direction 322 (e.g., vertically as seen in FIG. 3B). Accordingly, properties imparted by the fibers 320 may be generally imparted axially in direction 321 but not transversely in direction 322 for the composite radius filler 320, resulting in less than desired distribution of properties. For example, the composite radius filler 310 may have a CTE substantially lower than that of the resin 330 axially (e.g., the resin alone or when non-reinforced by fibers), but may have a CTE that is about the same of the resin 330 transversely (e.g., the resin alone or when non-reinforced by fibers).

FIG. 3C is a schematic side sectional view of a composite radius filler 350 having differently sized fibers dispersed in a resin 380, according to an embodiment of the present disclosure. As seen in FIG. 3C, the fibers include a first group of fibers 360 and a second group of fibers 370. The length of the first group of fibers 360 is greater than the length of the second group of fibers 370. The fibers 360, 370 of the composite radius filler 350 are substantially shorter than the continuous fibers 320 of the composite radius filler 310 depicted in FIG. 3B. Accordingly, the fibers 360, 370 of the composite radius filler 350, especially the second group of fibers 370, are able to be oriented in many different directions (including transverse direction 382 in addition to axial direction 381), while the continuous fibers 320 of the composite radius filler 310 are oriented only axially along direction 321.

For example, in various embodiments, the length of the first group of fibers may be greater than the length of the second group of fibers by a factor of 2, 3, or 5, among others. As seen in the illustrated embodiment, the length of the second group of fibers 370 is small enough to allow the second group of fibers 370 to orient transversely within the composite radius filler 310. The first group of fibers 360 is shown oriented axially in FIG. 3C. Accordingly, properties imparted by the fibers 360, 370 of the composite radius filler 350 depicted in FIG. 3C may be imparted transversely as well as axially, resulting in improved consistency and/or distribution of properties relative to the composite radius filler 310 depicted in FIG. 3B. For example, the composite radius filler 350 may have a CTE substantially lower than that of the resin 330 axially as well as transversely.

It may be noted that FIG. 3C is provided for illustrative purposes, and the various fibers are shown oriented only axially or only transversely for ease and clarity of illustration. In practice, the particular orientations may vary (e.g., a proportion of the second group of fibers 370 may align axially, or may align partially axially and partially transversely). While the axial and transverse properties may not be exactly equal in various embodiments, the transverse properties may still be improved substantially by use of a second group or fibers or fibers having a length short enough to permit substantial or sufficient transverse orientation in various embodiments. Thus, the second group of fibers 370 may be generally evenly distributed in various dimensions (e.g., directions 381 and 382) randomly. The first group of fibers 360 may be sufficiently long that the first group of fibers 360 are oriented more axially (e.g., along direction 381) than the second group of fibers 370. However, the first group of fibers 360 may be short enough so that the first group of fibers 360 may be partially aligned with directions other than the axial direction 381 (e.g., partially along transverse direction 382). As discussed herein, the first and second group of fibers 360, 370 may be mixed with the resin away from an assembly site into a paste, and then applied in situ to the assembly.

It may be noted that the shorter fibers in the second group of fibers impart improved transverse mechanical properties. Accordingly, the shorter fibers may be less effective in improving longitudinal (longitudinal direction is the only one where both fibers may be present according to our invention) material strength than the longer fibers of the first group of fibers. For example, longer fibers provided more bonding surface with a resin to allow more load transfer to longer fibers from the resin than to shorter fibers. In various embodiments, the proportion of the first and second groups of fibers relative to each other may be selected to provide a desired balance of axial and transverse properties. Additionally or alternatively, the proportion of the first and second groups of fibers relative to each other may be selected to provide a desired level of axial properties while maintaining the total volume of the first and second groups of fibers within a desired range (e.g., 40-50% of a total volume of the composite radius filler material 200). For example, in some embodiments, the first group of fibers 220 may have a volume between 20% and 40% of a combined volume of the first group of fibers 220 and the second group of fibers 230. The second group of fibers 230 may have a volume between 60% and 80% of a combined volume of the first group of fibers 220 and the second group of fibers 230.

Returning to FIG. 2, as discussed herein, the first group of fibers 220 and the second group of fibers 230 may be include, for example, fibers made of materials such as carbon fiber, E glass, S2 glass, Nomex®, or Kevlar®, among others. In some embodiments, the first and/or second groups of fibers may be made from a single type of fiber, while in other embodiments a mixture of fiber types may be employed. Generally speaking, carbon fibers have a very low CTE and high strength, but may be more brittle than fiberglass. Fiberglass may have a slightly higher CTE than carbon fiber, but may be substantially more stretchable and resilient. For example, fiberglass may permit twice the amount of stretching as permitted by carbon fiber. Accordingly, the fiber material may be selected based on the particular properties desired for the composite radius filler for a given application. In some embodiments, a mix of carbon fiber and fiberglass may be utilized to provide a balance between the properties of each. For example, in some embodiments, the first and second groups of fibers may each include fibers of both carbon and fiberglass.

It may be noted that the use of fibers will increase the modulus of typical resin materials to which the fibers are added. Accordingly, the proportion of fibers added to the resin may be selected to provide sufficient improvements in strength and/or CTE while limiting the increase in modulus. For example, with fibers at about 10% of the volume of the composite radius filler material 200, the added strength and/or CTE may be less than desired. However, with fibers at 90% of the volume of the composite radius filler material 200, the resulting filler may be more stiff than desired. Accordingly, the volume fraction of the fibers (e.g., the sum of the first group of fibers and the second group of fibers) may be selected to provide a desired amount of improvement to strength and/or CTE while limiting the increase in stiffness or modulus. For example, in various embodiments, the combined volume of the first group of fibers 220 and the second group of fibers 230 may be between 40% and 50% of the total volume of the composite radius filler material 200.

As another example, in various embodiments, the combined volume of the first group of fibers 220 and the second group of fibers 230 may be between 30% and 60% of the total volume of the composite radius filler material 200.

It may be noted that the particular volume selected for a given application may be affected by producibility. For example, if too much fiber is added, the composite radius filler material 200 may become not easily or practicably formable. On the other hand, if the fiber content is too low, the filler material may flow during cure which may cause issues regarding maintenance of a desired shape. Accordingly, the percentage of fiber used may be selected based on a balancing of various factors discussed herein.

It may be noted that the use of first and second groups of fibers as discussed herein may provide generally improved properties and homogeneity of properties for a composite radius filler, however; in practice the distribution of fibers may not be entirely uniform, which may lead to localized areas devoid of fibers from the first or second groups of fibers, or with less than a sufficient or desired amount of fibers from the first and second groups of fibers. These localized areas may be referred to as resin pockets.

In various embodiments, the third group of fibers 240 may be added to the resin 210 to form the composite radius filler material 200 to help address any resin pockets. The third group of fibers 240 in the illustrated embodiment includes fibers having a shorter length than the second group of fibers 230 to improve the properties or characteristics of any resin pockets formed in the composite radius filler material 200. The third group of fibers 240 may be substantially shorter than the first and second groups of fibers to allow for improved uniform distribution of the third group of fibers 240. The depicted third group of fibers 240 includes carbon nano-tubes. The diameter of the third group of fibers 240 may be, for example, 50 nanometers or less. In some embodiments, the diameter of all or a portion of the third group of fibers 240 may be 100 microns or less. In some embodiments, the diameter of all or a portion of the third group of fibers may be 30 microns or less.

For example, in some embodiments, the third group of fibers 240 may include carbon nano-tubes having a length between 100 and 200 microns. The length of the third group of fibers 240 is sufficiently short with respect to the dimensions of the noodle that the third group of fibers 240 will have a random orientation throughout the noodle. In some embodiments, the carbon nano-tubes may have a length of 150 microns or less. The proportion of the third group of fibers 240 may be relatively small. For example, in some embodiments, the third group of fibers 240 may account for less than 1% of the composite radius filler material 200 by volume.

In the embodiment depicted in FIG. 2, the composite radius filler material 200 includes thixotropic particles 250 dispersed within the resin 210. In some embodiments, the thixotropic particles 250 may include nanoparticles 251. The nanoparticles 251, for example, may improve resiliency or strength compared to larger thixotropic particles. Generally, the thixotropic particles 250 are configured to improve the viscosity of the composite radius filler material 200 for improved convenience of use as a paste or paste-like material applied to structural components during assembly of the components. Maintaining randomness of fiber orientation may also improve viscosity. Generally, the viscosity of the composite radius filler 200 may be configured to support manufacturability. For example, the viscosity of the composite radius filler 200 may be configured to be low enough to fill any sharp corners in a cavity to which a noodle made of the composite radius filler 200 will be added with a resin having desired fiber lengths. The viscosity may also be high enough to provide adequate support and to minimize ply wrinkles formed during a cure process. In various embodiments, a composite radius filler may have a viscosity between 300 and 9000 Poise at a temperature range of 100-140 degrees Celsius. For example, for a 3 sided wall structure (e.g., a structure using structural members 302, 304, 306 of FIG. 3), a cavity may be formed using two members (e.g., 302, 304), the composite radius filler 200 applied, and the third member (e.g., 306) positioned as desired. Thus, two of the members may be utilized to help form the composite radius filler or noodle.

In various embodiments, the addition of the thixotropic particles allows the composite radius filler material 200 to be spread smoothly, conveniently, and efficiently under an applied spreading pressure, but also allows the composite radius filler material 200 to harden or set after spreading.

Generally, the material for and the amount of thixotropic nanoparticles may be selected to provide a viscosity that is low enough to fill sharp corners in a noodle cavity (or space between structural members being joined by a composite radius filler material) and high enough to provide adequate support to a composite or laminate structure and to minimize or reduce ply wrinkles that may form during curing. Thixotropic nanoparticles, for example, may help increase viscosity during curing, which may help prevent the material being cured from deforming during curing. Ply wrinkles may be caused by insufficient support during deformation. For example, if the viscosity drops too much, noodle material may behave like a liquid in the cavity, allowing structural members to move relative to each other. The prevention of deformation provided by the thixotropic particles helps minimize or reduce ply wrinkles. In some embodiments, the thixotropic particles 250 may include nano-silica.

In the embodiment depicted in FIG. 2, the composite radius filler material 200 includes the toughening agent 260, which is configured to improve the resiliency of the resin. For example, in various embodiments, the toughening agent 260 may include one or more of carboxyl terminated polybutadine acrylonitrile (CTBN), core-shell nanoparticles, or nanostrength block copolymers.

Figure 4:
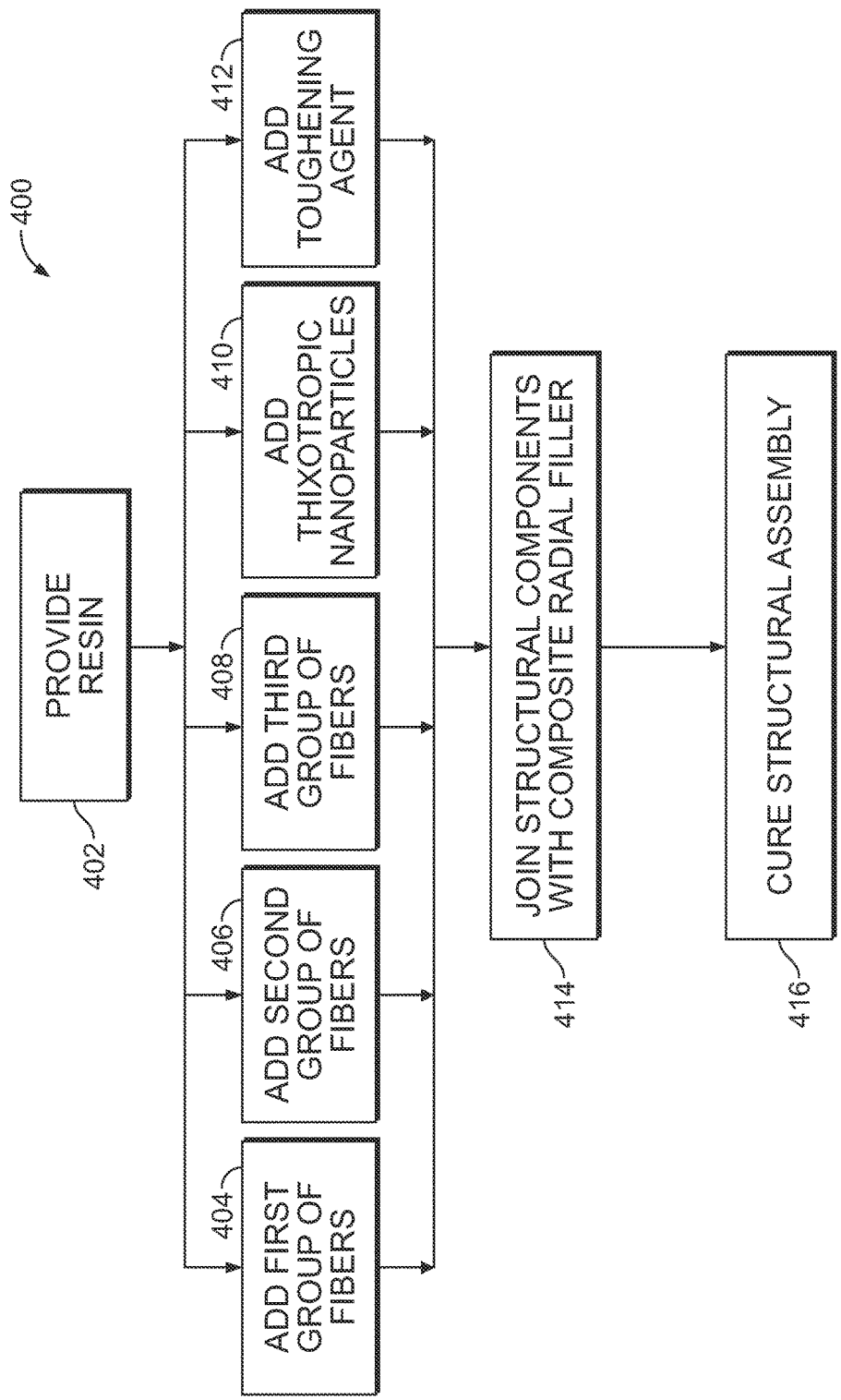
FIG. 4 is a flowchart of a method, according to an embodiment of the present disclosure.

FIG. 4 provides a flowchart of a method 400 (e.g., for providing and using a composite radius filler material), in accordance with various embodiments. The composite radius filler material may be configured for in-situ application for joining plural composite structures or components along a length. The method 400, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

Generally, for example, one or more toughening agents may be added to a resin, followed by addition of thixotropic particles (e.g., nanoparticles) and carbon nanotubes at the same time, then the second (or shorter) group of fibers, and then the first (or longer) group of fibers.

At 402, a resin (e.g., resin 210) is provided. The resin, for example, may be selected to match or correspond to a resin used for composite structural members to be joined by the composite radius filler material. By way of example, epoxy, phenolic, benzoxazine, or bis-maleimide (BMI) resins may be employed.

At 404, a first group of fibers (e.g., first group of fibers 220) is added to the resin. The first group of fibers may have a first length corresponding to an aspect ratio of 2000 or less. The length of the first group of fibers may be comparable to the transverse dimensions of the noodle. In some embodiments, the first group of fibers may have a length between 3 and 6 millimeters.

At 406, a second group of fibers (e.g., second group of fibers 230) is added to the resin. The second group of fibers, as discussed herein, has a second length that is less than the first length of the first group of fibers. It may be noted that the first and second lengths may correspond to average lengths or may correspond to a range of lengths. The proportion of the first and second groups of fibers with respect to each other and/or with respect to the total volume of the composite filler material may be selected or configured in various embodiments to provide a desired balance of properties or characteristics (e.g., strength, CTE, modulus, homogeneity). For example, in some embodiments, the first group of fibers account for between 20% and 40% of a combined volume of the first and second groups of fibers and the second group of fibers accounts for between 60% and 80% by volume of the combined volume of the first and second group of fibers. Additionally or alternatively, in some embodiments, a combined volume of the first and second group of fibers comprises between 30% and 60% of a total volume of the composite radius filler.

At 408, a third group of fibers (e.g., third group of fibers 240) is added to the resin. The third group of fibers may include carbon nanotubes (e.g., having a length of 200 microns or less), and may be added to improve properties (e.g., strength and/or CTE) of potential resin pockets that may be formed in the composite radius filler material.

At 410, thixotropic particles (e.g., thixotropic particles 250) are added to the resin. Generally, the thixotropic particles are selected or configured to improve the viscosity of the radius filler material for improved ease and effectiveness of application.

At 412, a toughening agent (e.g., toughening agent 260) is added to the resin. Generally, the toughening agent is configured to improve the resiliency, or reduce the brittleness, of the composite radius filler material. As discussed herein, the toughening agent 260 may include one or more of CTBN, core-shell nanoparticles, or nanostrength block copolymers.

At 414, structural components are arranged and joined to each other using the composite radius filler material applied to one or more of the structural components along a length to form a structural assembly. For example, the composite radius filler material may be a paste or paste-like material applied to the structural components using a roller under sufficient pressure to fill sharp corners in the space between the structural members being joined.

At 416, the structural assembly is cured. For example, the assembly may be heated to a predetermined temperature at a predetermined pressure for a predetermined amount of time to cure the assembly. After curing, the assembly may be cooled (e.g., to room temperature).

Figure 7:
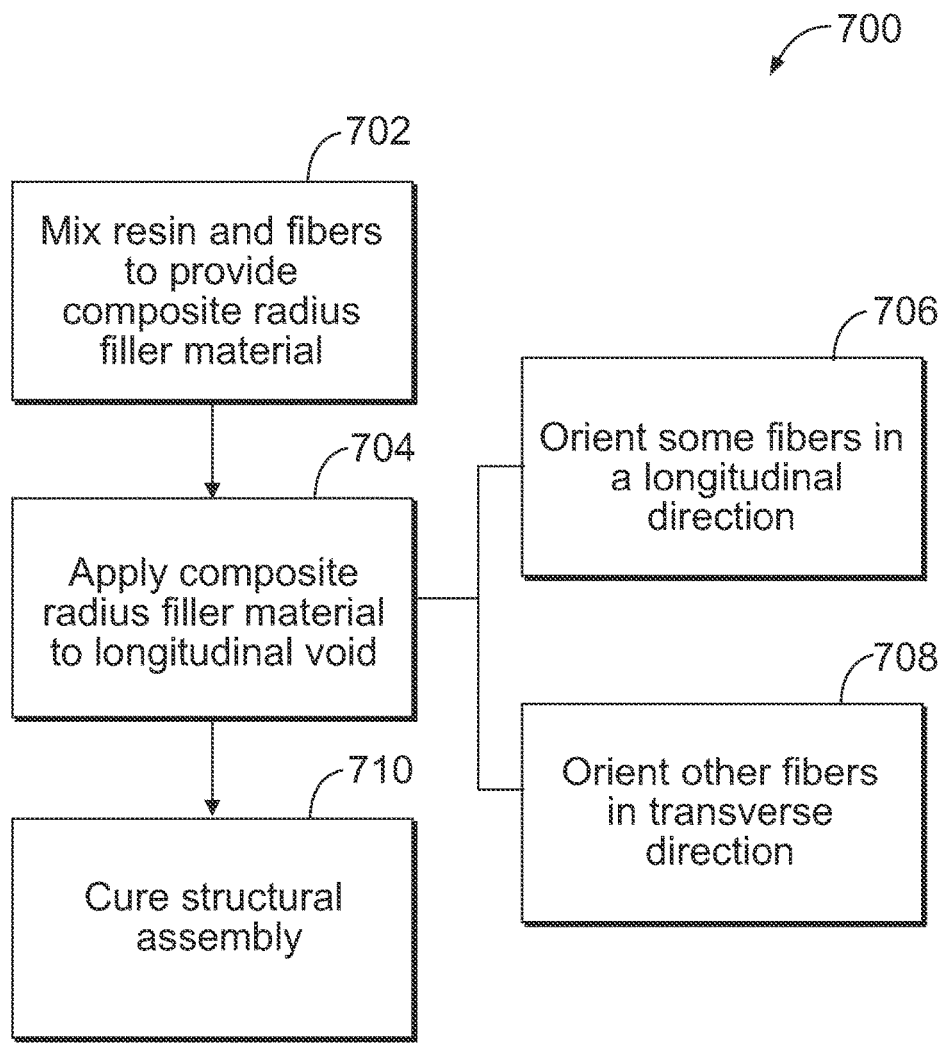
FIG. 7 is a flowchart of a method, according to an embodiment of the present disclosure.

FIG. 7 provides a flowchart of a method 700 (e.g., for installing a noodle), in accordance with various embodiments. The noodle (or composite radius filler material) may be configured for in-situ application for joining plural composite structures or components along a length, for example filling in a void between plural composite structures. The method 700, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. Generally, the illustrated embodiment (as well as other embodiments discussed herein) may be utilized to orient (e.g., randomly) a sufficient number of fibers in a longitudinal direction and a sufficient number in a transverse direction to provide a strong, easy to manufacture, and easy to apply noodle or composite radius filler. For example, fibers may be oriented in sufficient proportions longitudinally and transversely during an easy to accomplish paste application to create a noodle with desired strength and resilience. It may be noted that, as viscosity is a function of temperature, the temperature may be controlled to provide desired viscosity. For example, in some embodiments, composite radius filler material may be warmed (e.g., to 190 degrees Fahrenheit) to soften the material for extrusion into a noodle. It may also be noted that pressure may be applied to a noodle, for example, after a noodle is placed in a stringer, for example to help force material into sharp corners.

At 702, a resin and fibers are mixed to form a composite radius filler material. The composite radius filler material may be formed as a paste or paste-like material that may be applied in-situ (e.g., the resin and fibers may be mixed at a first location, and then applied to composite structure at a second location that is different than the first location). In various embodiments, the fibers may include two or more groups of fibers. For example, a first group of fibers may have a first length configured for longitudinal orientation and a second group of fibers having a second length shorter than the first length, with the second group of fibers configured for transverse orientation and/or filling corners.

At 704, the composite radius filler material is applied to a longitudinal void. For example, the composite radius filler material may be applied (e.g., as a paste) to a longitudinal void between two or more composite structural members to form a noodle that fills a void between the two or more composite structural members along a length of the composite structural members.

At 706, fibers of the composite radius filler material are oriented (e.g., randomly) in the longitudinal direction during application of the composite radius filler to the longitudinal void. For example, fibers of a first group may have a first length that is sufficiently large to prevent transverse orientation of the fibers of the first group. At 708, fibers of the composite radius filler material or oriented (e.g., randomly) in a transverse direction during application of the composite radius filler to the longitudinal void. For example, fibers of a second group may have a second length that is sufficiently small to allow transverse orientation of the fibers of the first group. The fibers of the second group may be oriented at the same time as the fibers of the first group (e.g., during an extrusion or other application of the composite radius filler material to structural members) and/or subsequently (e.g., during an application of pressure to a noodle after a noodle has been placed in a cavity or stringer). Thus, the composite radius filler may be applied to structural components to provide a structural assembly including a noodle having sufficient fibers oriented both longitudinally and transversely, for example to provide desired properties in various directions. It may be noted that fibers of the second group in various embodiments may be oriented in both longitudinal and transverse orientations.

It may be noted that steps 704, 706, 708 may be performed with a structural assembly partially formed. For example, for a 3 sided wall structure (e.g., a structure using structural members 302, 304, 306 of FIG. 3), a cavity may be formed using two members (e.g., 302, 304), with the composite radius filler 200 applied to a cavity defined by the two members (e.g., 302, 304), and the third structural member (e.g., 306) subsequently positioned and added to the assembly. In some embodiments, a noodle may be extruded through a nozzle with an appropriate cross-section and placed in a stringer or cavity. In other embodiments, composite radius filler material may be injected into a noodle cavity, with pressure applied to form the composite radius filler material to a final shape. Thus, walls of at least some of the structural members may be used to help form a noodle.

At 710, the structural assembly is cured. For example, the assembly may be heated to a predetermined temperature at a predetermined pressure for a predetermined amount of time to cure the assembly. After curing, the assembly may be cooled (e.g., to room temperature).

Figure 5:
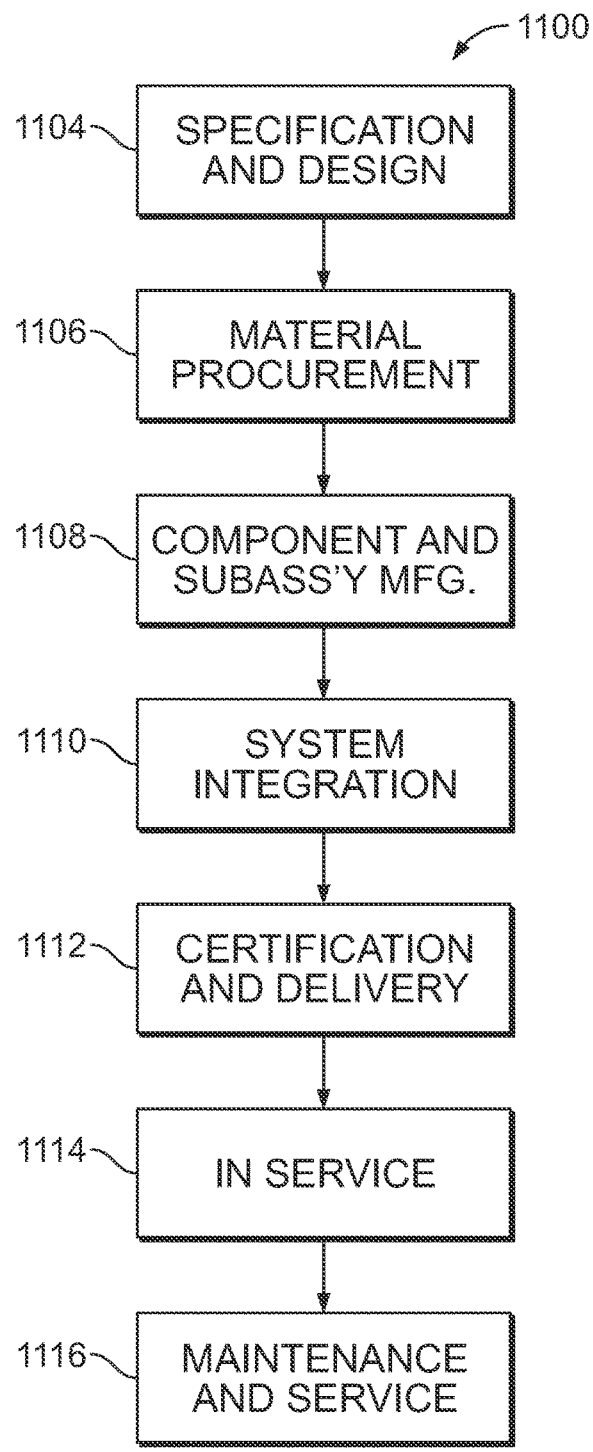
FIG. 5 is a block diagram of aircraft production and service methodology.
Figure 6:
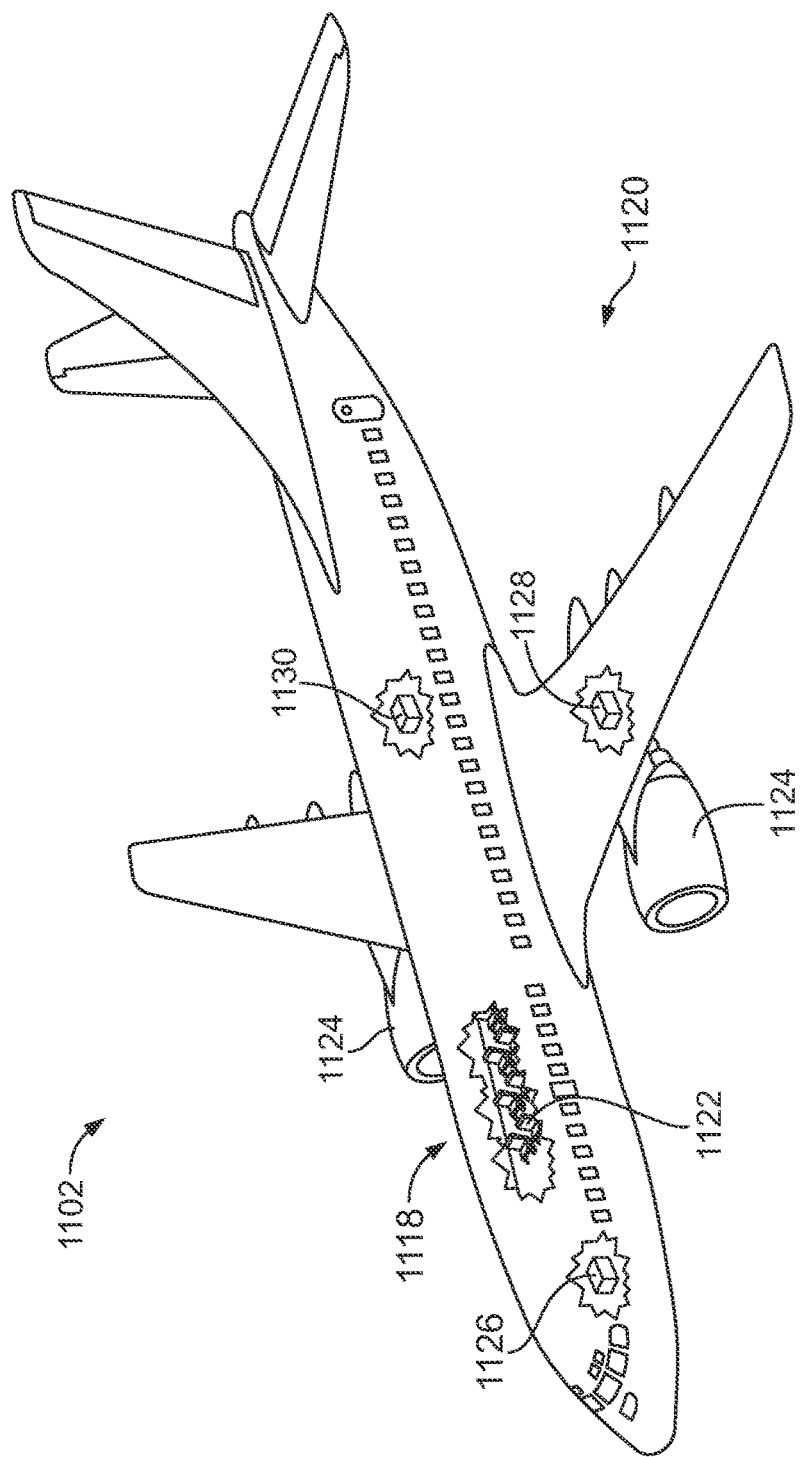
FIG. 6 is a schematic illustration of an aircraft.

Examples of the present disclosure may be described in the context of aircraft manufacturing and service method 1100 as shown in FIG. 5 and aircraft 1102 as shown in FIG. 6. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on. For example, various aspects disclosed herein may be utilized during one or more of steps 1106, 1108, or 1110 of the method 1100, and/or in connection with one or more of elements 1118 or 1122 of the aircraft 1102.

As shown in FIG. 6, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

Referring to FIGS. 1-7, embodiments of the present disclosure provide for improved composite radius filler materials. For example, mechanical or structural properties are improved in various embodiments. As another example, cracking of composite radius fillers is reduced or eliminated in various embodiments. As another example, various embodiments provide a composite radius filler that may be conveniently, effectively, and efficiently be applied in-situ during assembly of a structural assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for providing a composite radius filler having a length and a transverse dimension extending along a transverse direction that is transverse to the length, the method comprising:
   providing a resin;
   adding a first group of fibers within the resin, the first group of fibers having a first length that is sufficiently large to prevent transverse orientation; and
   adding a second group of fibers within the resin, the second group of fibers having a second length that is shorter than the first length, the second length sufficiently small to allow transverse orientation;
   applying the composite radius filler as a paste to plural composite structures to form a structural assembly; and
   curing the structural assembly.

2. The method of claim 1, further comprising filling a void defined by the plural composite structures along a length of the plural composite structures, wherein the transverse dimension extends perpendicularly to the length of the plural composite structures.

3. The method of claim 1, wherein adding the first group of fibers to the resin and adding the second group of fibers to the resin is performed at a first location away from a second location at which the plural composite structures are joined to provide the structural assembly.

4. The method of claim 1, wherein the first group of fibers has an aspect ratio of 2000 or less, wherein the first length is between 0.25 and 2 times the transverse dimension.

5. The method of claim 1, wherein the second length is between 0.05 and 0.25 times the transverse dimension, wherein the second group of fibers are configured to be oriented at additional orientations with respect to the transverse dimension than the first group of fibers.

6. The method of claim 1, wherein the first group of fibers includes fibers having a length between 3 and 6 millimeters.

7. The method of claim 1, wherein the first group of fibers comprises between 20% and 40% of a combined volume of the first and second groups of fibers; and the second group of fibers comprises between 60% and 80% by volume of the combined volume of the first and second group of fibers.

8. The method of claim 1, wherein a combined volume of the first and second group of fibers comprises between 30% and 60% of a total volume of the composite radius filler.

9. The method of claim 1, further comprising adding a third group of fibers to the resin, the third group comprising carbon nano-tubes.

10. The method of claim 1, further comprising adding thixotropic nanoparticles to the resin.

11. The method of claim 1, further comprising adding a toughening agent to the resin.

* * * * *